July 23, 1935.  F. A. DELANO  2,009,167
TRANSPARENT BODY
Filed April 6, 1932
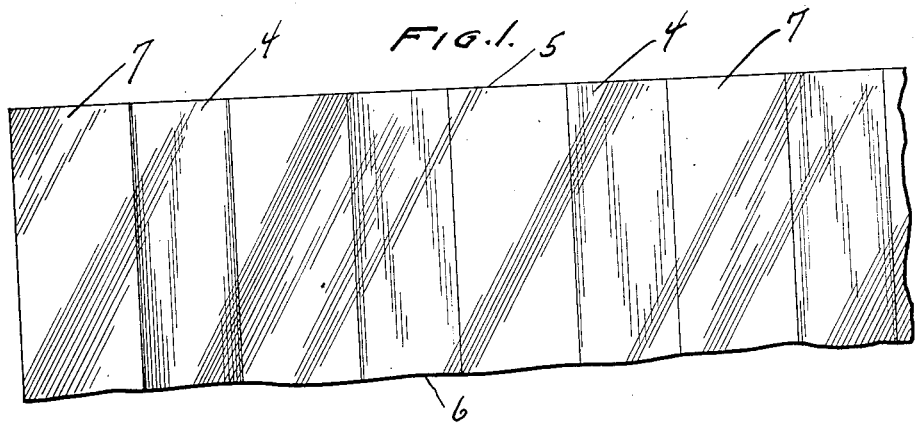
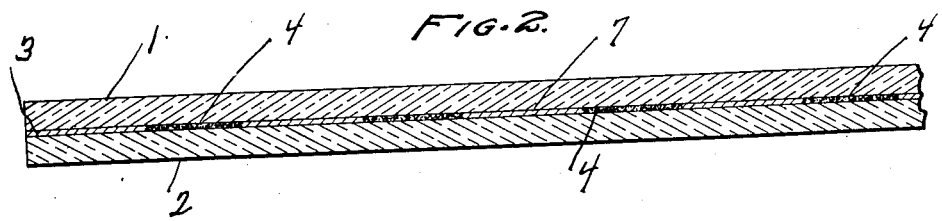
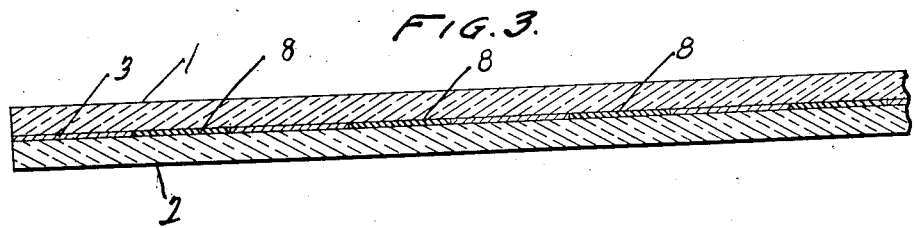
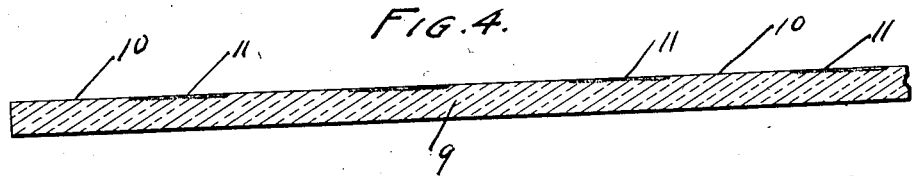
Inventor
FREDERIC A. DELANO
By Semmes & Semmes
Attorneys Patented July 23, 1935

2,009,167

UNITED STATES PATENT OFFICE 2,009,167

TRANSPARENT BODY

Frederic A. Delano, Washington, D. C.

Application April 6, 1932, Serial No. 603,652

7 Claims. (Cl. 49—92)

This invention relates to improvements in transparent bodies and more particularly to improved window glass.

There are many circumstances in which it is desirable to provide a transparent material, such as window glass, which will permit appreciable vision in one direction while diminishing this vision in the other direction. Thus it is many times desirable to have a window pane which will permit vision of exterior objects by persons within the room and yet largely restrict view of objects within the room by persons on the exterior.

The present invention relates to such window panes and is a continuation in part of prior application Serial No. 328,488, filed December 26, 1928.

An object of the present invention is to provide a sheet of transparent material, such as glass, which will permit an object to be relatively clearly viewed through the glass in one direction and will restrict such view in the opposite direction.

Another object is to provide an improved window pane which provides so-to-speak a one-way vision while at the same time insuring sufficient illumination within a room.

A further object is to provide a novel window pane of improved mechanical characteristics.

A further object is to provide a window pane which may be cheaply and simply fabricated and which largely serves to obstruct view of objects in the interior of the room while insuring reasonable vision of exterior objects.

With these and other equally important objects in view the invention comprehends the concept of providing a window pane having two surfaces in parallel planes which, by reason of its construction, permits a reasonable degree of view in one direction while limiting it in the other. The invention may be embodied in a number of specifically different structures, in some of which advantages in addition to one-way vision are secured.

To more clearly explain the invention typical embodiments are shown in the accompanying drawing, in which:

Fig. 1 is a plan view of a section of window pane.

Fig. 2 is a central cross section of the window pane shown in Fig. 1.

Figs. 3 and 4 are cross sectional views of modifications of the invention.

As shown in the drawing, the invention in one form may comprise a window pane made up of two laminae 1 and 2 of suitable glass. This, for example, may be a suitable soda lime plate glass made by any approved process. In this particular modification the window pane comprises reenforced glass. The two sheets or sections 1 and 2 are cemented together by means of the adhesive 3. This attachment of the two panes, as will be understood, may be secured by interposing a suitable gummy cement or plastic, such for example as a cellulose ester, between the two panes 1 and 2 and submitting the composite glass structure to pressure. In accordance with the invention, in certain predetermined sections or portions of the cementitious material a pigment is interposed. Preferably this pigment is one which has a relatively high index of diffused reflection. Such pigments, for example, may comprise finely ground aluminum oxide, magnesium carbonate and so forth. This pigment is so incorporated in the adhesive that the pigmented sections 4 of considerable width extend across one dimension of the glass, for example between one side 5 and the opposite side 6. Each pigmented section, as clearly shown in Fig. 2, is spaced a considerable distance from the next pigmented section so that a clear transparent glass section 7 is provided. The section 7, like the non-transparent sections 4, extend across one dimension of the glass. The primary purpose of this type of structure is to provide portions or sections of the pane extending across one dimension which permits clear vision and adjacent sections, either of the same or smaller width, in which vision is obstructed. It will be understood that by varying the quantity of pigment incorporated in the cementitious laminæ 3, a wide range of light control may be secured. For example, a relatively large quantity of the pigment may be incorporated, in which case the light falling upon this section will be largely reflected in diffused form. By diminishing the quantity of the pigment in this section the ratio of diffused reflected light to transmitted light may be decreased.

It will be appreciated that in this type of structure when two or more laminæ of glass are adhered together a non-shattering pane is secured.

The width of the sections 4 and 7 may be varied within relatively wide limits depending upon the particular installation. It will be appreciated that when such a pane is mounted in a window and the width of the sections 4 and 7 properly chosen, a substantially one-way vision is secured. This is because of the fact that due to the relatively short distance between the window pane and the eye of an observer in the room, the angle subtended at the eye by the section 7 is relatively large and therefore the corresponding extended field of view is sufficiently large to permit comprehensive vision. On the other hand, since the average distance of a person on the outside of a window is considerably greater, the angle subtended at the observer's eye by each of the sections 7 becomes smaller and the interfering effect of the sections 4 becomes relatively greater. The structure is, therefore, made up of clear translucent and transparent sections of sufficient dimensions to permit vision therethrough when an observer is standing relatively close, but of insufficient dimensions to permit clear vision when an observer is spaced an appreciable distance away. The intermediate obstructing sections 4 serve to interfere with vision through the glass but, due to their formation, nevertheless permit any desired degree of translucency and therefore do not diminish to any considerable extent the illumination within the room.

The present improvement, therefore, in common with the structures disclosed in the copending application referred to, insures an improved one-way vision window pane. The present improvement has the advantage, as compared to the earlier disclosure, of a simplified method of manufacture inasmuch as it requires no special apparatus in the form of specially designed rollers or any additional operations in the nature of cutting angular surfaces. The composite pane may be made up from two simple sheets of glass having uniformly parallel surfaces. In other words, it may be made from stock glass. The only additional operation necessary in securing the improved structure and results is the application of the pigments in the intermediate adhesive.

It will be appreciated that with the given concept in view other specific forms of window glass may be made up. For example, and as is shown in Fig. 3, a one-way vision and reenforced window pane may be made by providing the two similar glass sheets 1 and 2 and adhering or joining these under pressure by means of the interposed adhesive 3. In this form of the invention the obscuring or interfering sections 8 are provided which, like the sections 7, are of appreciable width and extend entirely across one dimension of the window. These sections 8 instead of being of a discrete mineral pigment may comprise a very thin continuous sheet or foil of some suitable metal, such for example as a thin foil of a white metal like aluminum or preferably of a colorless alloy having a low coefficient of thermal expansion. It will be seen that this structure operates in precisely the same manner as that shown in Fig. 2. It serves as a one-way window glass and in addition to this has the added advantage of being reenforced and non-shatterable.

While the two advantages of controlled vision and improved mechanical structure, particularly non-shatterability, are desirable, the major advantage of the invention, namely controlled visibility, may be obtained alone by a very simple method. An example of this is indicated in Fig. 4. According to the invention shown in Fig. 4 the window pane may comprise a single sheet of glass 9 which may be stock glass made up by any of the usual methods. This sheet is provided with the clear transparent sections 10 and the interfering sections 11. The interfering sections 11 are simply made by altering the surface characteristics of the single pane. This may be done, in a simple manner, by merely etching this section. For example, this improvement may be secured by taking a typical window pane, covering the surface sections 10 with wax, while leaving the sections 11 bare or unwaxed, and then applying a suitable etching material such as hydrofluoric acid. The acid may be allowed to react with the glass for a short period of time and then the wax removed merely by dipping the glass in hot water. After such treatment the surfaces 10 comprise etched sections which will diffuse or scatter light and thus, in accordance with the precepts of the invention, interfere with vision at these sections. The sections 10 and 11, correspondingly to the sections 4 and 7, are of suitable dimensions so as to operate in the manner described, namely to permit vision and a reasonably large field of view to an observer situated within the room, while obscuring observation of objects within the room by a person on the exterior.

It will be observed then that by relatively simple methods stock glass may be treated so as to secure an improved window pane which subserves the desirable functions herein stated. By properly choosing the materials of a composite structure, as for example by adhering two sheets of glass together and interposing a pigment or a thin metal foil, the added structural advantage of non-shatterability may be secured.

While preferred modifications of the invention have been described, it is to be understood that these are given merely as typical examples of simple methods by which the improved results of the invention may be secured. It is therefore not intended to limit the invention to these structures described except as such limitations are clearly imposed by the appended claims.

I claim:

1. A window pane comprising a glass structure having two continuous parallel surfaces, the pane having incorporated therein translucent material which materially diminishes transparency while permitting light to pass therethrough, such material being included in the pane in the form of spaced sections which extend across one dimension and each of said sections being laterally spaced from the next adjacent similar section by a clear transparent portion of the pane; the transparent portions and non-transparent sections being so respectively arranged as to permit vision through the pane when an observer is relatively close to the pane but largely restrict such vision when an observer is relatively distant from the pane.

2. A window pane comprising cemented laminæ of transparent glass and translucent material interposed between the laminæ at spaced sections which renders relatively large sections of said pane translucent but substantially non-transparent.

3. A window pane comprising cemented laminæ of transparent glass and a discrete mineral compound included between the laminæ in the form of rectilinear spaced sections, said compound being characterized by a relatively high degree of diffuse reflection and being embodied in the pane in spaced sections of relatively large area so as to present sections of the pane which are translucent but substantially non-transparent, said translucent sections being each contiguous to a larger transparent section.

4. A window pane comprising laminæ of transparent glass bonded together with a cementitious substance, a mineral included only in the spaced sections of the cementitious binder, the composite pane comprising spaced alternate transparent and non-transparent sections so relatively disposed as to permit vision of objects therethrough when an observer is positioned relatively close to the pane but to largely restrict clear vision when an observer is positioned relatively distant from the pane.

5. A window pane comprising a glass sheet having opposite continuous parallel surfaces, one of said surfaces having rectilinear etched sections, said etched section being spaced from the next adjacent section by an unetched section of glass of greater width than the etched section, such etched and unetched sections extending continuously across one dimension only of the pane and being so respectively arranged as to permit vision through the pane when an observer is relatively close to the pane but largely obscure vision when an observer is relatively distant from the pane.

6. A window pane comprising laminæ of transparent glass bonded together with a cementitious substance, a strip of metal foil of appreciable width interposed between the laminæ, said foils being spaced laterally from each other a distance greater than the width of the foil, the spacing of said foils and the transparent sections being such that vision of objects are permitted through the pane when an observer is relatively close to the pane but is largely obscured when the observer is relatively distant from the pane.

7. A window pane comprising a glass having therein parallel strips of translucent material which obstruct vision while permitting light to pass therethrough, and between said translucent strips parallel strips of clear vision, the relative areas of the clear vision and translucent strips being such that vision through the pane is permitted when the observer is relatively close thereto but greatly restricted when the observer is distant from the pane.

FREDERIC A. DELANO.